(No Model.) 2 Sheets—Sheet 1.
I. B. KILGORE.
SULKY CULTIVATOR.
No. 362,285. Patented May 3, 1887.
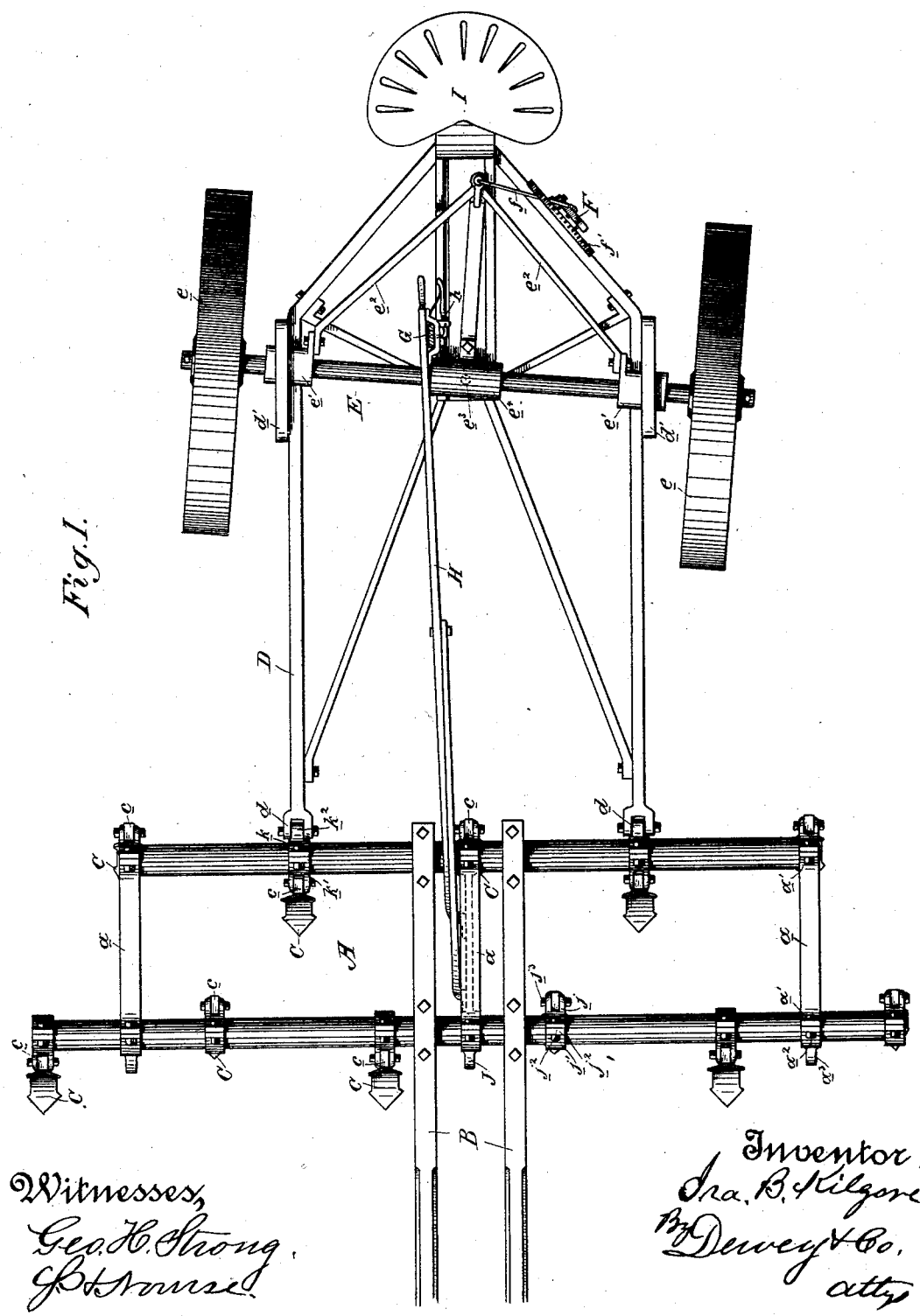
Fig. I.
Witnesses,
Geo. H. Strong
G. H. Nourse
Inventor,
Ira. B. Kilgore
By Dewey & Co.
Atty (No Model.) 2 Sheets—Sheet 2.
I. B. KILGORE.
SULKY CULTIVATOR.
No. 362,285. Patented May 3, 1887.
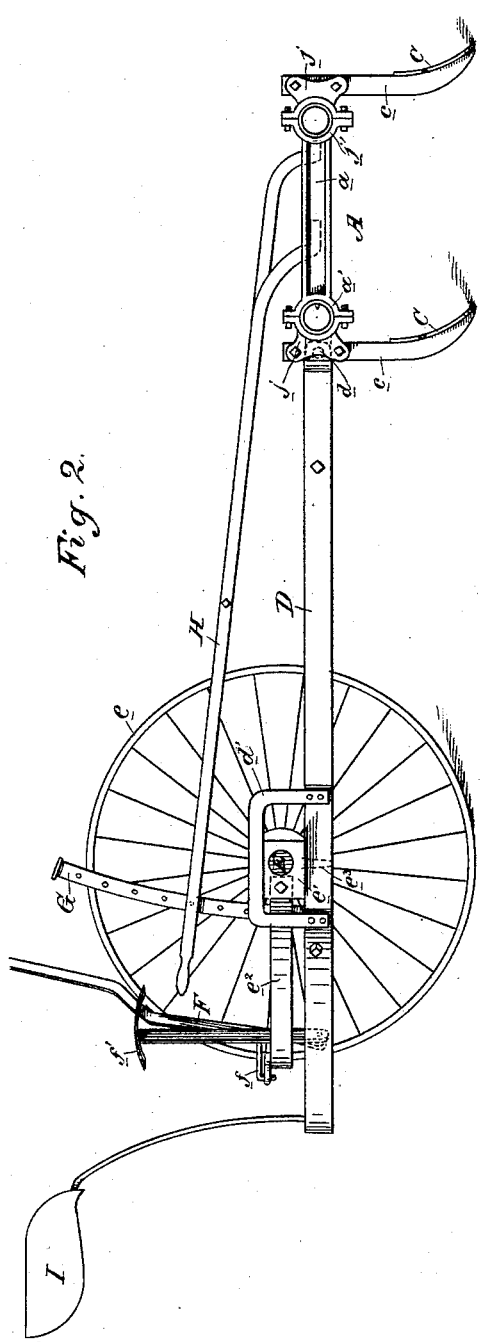
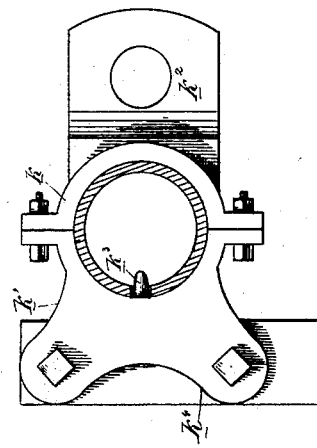
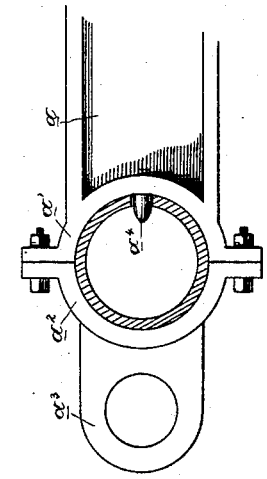
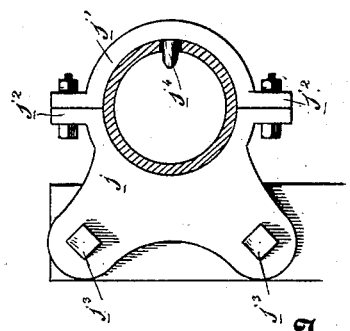
Witnesses,
Geo. H. Strong.
Inventor,
Ira B. Kilgore
By Dewey & Co.
attys ly by rea- 100
UNITED STATES PATENT OFFICE.

IRA B. KILGORE, OF SAN FRANCISCO, CALIFORNIA.

SULKY-CULTIVATOR.

SPECIFICATION forming part of Letters Patent No. 362,285, dated May 3, 1887.

Application filed February 17, 1887. Serial No. 227,997. (No model.)

*To all whom it may concern:*

Be it known that I, IRA B. KILGORE, of the city and county of San Francisco, and State of California, have invented an Improvement in Sulky-Cultivators; and I hereby declare the following to be a full, clear, and exact description thereof.

My invention relates to the class of agricultural implements, and especially to sulky-cultivators; and my invention consists in the construction and combination of devices, which I shall hereinafter fully describe and claim.

Referring to the accompanying drawings, Figure 1 is a plan of my sulky-cultivator. Fig. 2 is a side elevation of same. Figs. 3, 4, and 5 are views showing the various forms of clamp.

A is the tooth-carrying frame. It consists of two pieces of gas-pipe, which are united by cross-pieces $a$ and by the tongue or pole B.

C are the teeth, having shanks $c$, which are secured to the bars of the frame A in a manner I shall presently describe.

D is a frame, the forward end of which is hinged at $d$ to the rear of the frame A.

E is an axle, having wheels $e$. This axle passes, in suitable sliding boxes, $e'$, through elongated yokes $d'$ on the frame D, whereby said frame is suspended from the axle, and said axle, by reason of passing through the yokes of the frame, may have a movement so as to turn to an angle with the frame, this movement being accomplished by means of a lever, F, pivoted to the frame D, and connected by a link, $f$, with the frame-bars $e^2$, extending backwardly from the boxes $e'$. This movement takes place upon the pivot-bolt $e^3$, which passes down through a bearing, $e^4$, at the center of the axle and into the frame D. The lever F engages a rack, $f'$, whereby it is held in position.

Rising from the frame D about its center is a rack-standard, G, and secured to the center of the tooth-carrying frame A is a lever, H, which extends backwardly and has a spring-actuated pawl, $h$, which engages the rack-standard, whereby said lever may be held at any desired elevation.

I is the driver's seat, secured to the rear of the frame D and behind the axle.

J is a clevis attached to the center of the forward bar of the frame A, under the pole or tongue B.

The operation of the machine is as follows: The driver, when occupying his place, has the lever H directly in front of him. As long as the lever engages the rack G the connection of the two frames A and D is a rigid one; but upon releasing the lever and allowing it to move upon the rack-standard the rear of frame D is depressed, said frame turning on the axle, and this movement through the lever, which is attached to the frame A forward of its hinge-connection with the wheeled frame, elevates said frame A, thus raising its teeth to the desired height at which they are fixed by the re-engagement of the lever with the rack. By pulling down the lever again the reverse operation takes place, and the teeth may be thrown into the ground and fixed at the required depth. On account of the balancing of the machine in this manner but little power is required to effect this operation. The driver can thus make the cultivator clear itself by raising its teeth clear of the ground; or, if that is insufficient, he may carry a stick and punch it out—an operation which could not well be performed if he were riding in front of the cultivator. As far as this main operation of the machine is concerned, the entire wheeled frame back of the tooth-carrying frame might be a single one, instead of having practically two frames, the one designated by D and the other constituting the axle-frame; but the construction described is to enable the operator to readily turn the machine, or, if desired, operate on side hills.

It will be seen that by operating the lever F the wheels may be at once turned to an angle with the previous line of travel, thereby throwing the tooth-carrying frame around, and this movement will enable the machine not only to turn the corners, but also to turn temporarily out of the way of any projection or obstruction in the line of travel.

The entire tooth-carrying frame is of simple construction, cheap, and yet durable.

As stated before, the main bars are of gas-pipe, and all the clamps are of the same general nature, though differing slightly by reason of the uses to which they are put. They are thus constructed: The clamps shown in Fig. 3, and which secure the tooth-shanks to the bars, consist of two curved parts, $j\ j'$, which together encircle the bar and are bolted together through their impinging ears $j^2$. One of these parts—namely, $j$—is provided with a slot in its front for the reception of the tooth-shank, and with ears which receive bolts $j^3$ passing through the shank. The other part, $j'$, has on its inner surface a small pin or lug, $j^4$, which enters a corresponding socket or indentation in the gas-pipe, thereby holding the clamps more firmly. Where these clamps are used for connecting the gas-pipe bars together, they are made as shown in Fig 4—that is to say, one part, $a'$, is made with the bars $a$ and the other, $a^2$, is bolted to it, as shown, and may have an eye, $a^3$, in front for a chain-connection when necessary, and the part $a'$ has the pin or lug $a^4$ engaging a socket in the gas-pipe for holding it firmly.

The remaining form of clamp (shown in Fig. 5) consists of two curved parts, $k\ k'$, the former having an eye, $k^2$, and the latter the pin or lug $k^3$ and slotted front $k^4$. These are used for the hinges at $d$ and for the clevis J.

Having thus described my invention, what I claim as new, and desire to secure by Letters Patent, is—

1. In a sulky-cultivator, a tooth-carrying frame, in combination with a frame connected with its rear and supporting the driver's seat, a wheeled axle supporting said frame and centrally pivoted thereto, sliding boxes in which the ends of said axle are mounted, and a lever and connections for turning the wheeled axle to an angle with the frame it supports, substantially as described.

2. In a sulky-cultivator, the tooth-carrying frame A, in combination with the frame D, connected to its rear and having the driver's seat and elongated yokes, the wheeled axle E, the sliding boxes in which said axle is mounted, said axle being centrally pivoted to frame D, whereby it may turn to an angle with the frame, and the lever F and connections by which said movement is effected, substantially as described.

3. In a sulky-cultivator, the combination of the tooth-carrying frame, the frame D, hinged to its rear and having the driver's seat at a point back of the axle and the elongated yokes, the wheeled axle pivoted centrally to the frame D and mounted in sliding boxes in the yokes of said frame, the lever F and connections for turning the wheeled axle to an angle, the lever H, attached to the tooth-carrying frame for raising and lowering it, and the rack-standard G on the frame D, for holding said lever in position, substantially as described.

4. In a cultivator, the bars $a$ for connecting the frame-bars, said bars having clamps consisting of the part $a'$, having the pin or lug $a^4$, and the part $a^2$, bolted to part $a'$ and having an eye, $a^3$, substantially as described.

In witness whereof I have hereunto set my hand.

IRA B. KILGORE.

Witnesses:
H. M. BISSELL,
J. H. BLOOD.